United States Patent
Nakamura et al.

(10) Patent No.: US 10,939,019 B1
(45) Date of Patent: Mar. 2, 2021

(54) IMAGE PROCESSING APPARATUS, IMAGE FORMING APPARATUS AND IMAGE PROCESSING METHOD FOR INCREASING SPEED OF PIXEL PROCESSING OF INDEX COLORS

(71) Applicant: KYOCERA Document Solutions Inc., Osaka (JP)

(72) Inventors: Masayoshi Nakamura, Torrance, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/670,906

(22) Filed: Oct. 31, 2019

(51) Int. Cl.
  H04N 1/60 (2006.01)
  H04N 1/64 (2006.01)

(52) U.S. Cl.
  CPC .......... *H04N 1/6019* (2013.01); *H04N 1/648* (2013.01)

(58) Field of Classification Search
  None
  See application file for complete search history.

(56) References Cited

U.S. PATENT DOCUMENTS

| | | | |
|---|---|---|---|
| 7,292,364 B2 | 11/2007 | Hosokawa | |
| 7,385,730 B2 | 6/2008 | Ogasahara et al. | |
| 7,986,434 B2* | 7/2011 | Quach | H04N 1/6019 358/1.9 |
| 2007/0139673 A1* | 6/2007 | Tanaka | H04N 1/508 358/1.9 |
| 2012/0307270 A1* | 12/2012 | Nakajima | H04N 1/56 358/1.9 |
| 2016/0179442 A1* | 6/2016 | Do | G06F 3/1221 358/1.16 |

* cited by examiner

*Primary Examiner* — Dung D Tran
(74) *Attorney, Agent, or Firm* — Hawaii Patent Services; Nathaniel K. Fedde; Kenton N. Fedde (57) ABSTRACT

Provided is an image processing apparatus for increasing the speed of pixel processing of index colors. A LUT reading unit reads a LUT for converting index colors to pixel values for each plane. A first storage unit stores the look up table read by the LUT reading unit. A plane LUT copying unit acquires pixel values corresponding to each place from the look up table stored in the first storage unit. A second storage unit stores the pixel values acquired by the plane LUT copying unit. A pixel processing unit performs image data processing using the pixel values stored in the second storage unit.

11 Claims, 6 Drawing Sheets

INDEX COLOR IMAGE DATA

| 0 | 0 | 1 | 2 | 3 |
|---|---|---|---|---|
| 0 | 1 | 2 | 3 | 2 |
| 0 | 2 | 3 | 2 | 1 |
| 2 | 3 | 2 | 1 | 0 |

B

INDEX MAP

| INDEX COLOR | PIXEL VALUE | | | |
|---|---|---|---|---|
| | C | M | Y | K |
| 0 | 31 | 47 | 31 | 0 |
| 1 | 127 | 23 | 95 | 2 |
| 2 | 64 | 192 | 0 | 0 |
| 3 | 0 | 112 | 132 | 132 |

C

PIXEL DATA (PLANE C)

| 31 | 31 | 127 | 63 | 0 |
|---|---|---|---|---|
| 31 | 127 | 63 | 0 | 63 |
| 127 | 63 | 0 | 63 | 127 |
| 63 | 0 | 63 | 127 | 31 |

IMAGE PROCESSING APPARATUS, IMAGE FORMING APPARATUS AND IMAGE PROCESSING METHOD FOR INCREASING SPEED OF PIXEL PROCESSING OF INDEX COLORS

BACKGROUND

The present disclosure relates to an image processing apparatus, an image forming apparatus, and an image processing method, and more particularly to an image processing apparatus, an image forming apparatus, and an image processing method that perform pixel processing of index colors.

Conventionally, there is an image forming apparatus such as a multifunction peripheral (MFP) or the like capable of printing documents or images.

In this kind of an image forming apparatus, image processing by a RIP (Raster Image Processor) for forming an image of page data described in a page description language such as Postscript (registered trademark) or the like is performed.

Therefore, there is a device that includes an application specific integrated circuit (ASIC) for increasing the speed of this RIP process.

SUMMARY

The image processing apparatus according to the present disclosure is characterized by including: a look up table reading unit configured to read a plurality of look up tables for color converting index colors into pixel values for each plane; a first storage unit configured to store the plurality of look up tables read by the look up table reading unit; a plane LUT copying unit configured to acquire a look up table corresponding to the plane to be processed from the plurality of look up tables stored in the first storage unit; a second storage unit configured to store the look up table acquired by the plane LUT copying unit; and a pixel processing unit configured to perform image data processing that performs color conversion according to the look up tables stored in the second storage unit.

The image forming apparatus according to the present disclosure is characterized by including the image processing apparatus.

The image processing method according to the present disclosure is characterized by an image forming method executed by an image processing apparatus, whereby the image processing apparatus, including the steps of: reading look up tables for converting index colors into pixel values for each plane; storing the read look up tables in a first storage unit; acquiring a look up table from the look up tables stored in the first storage unit that correspond to the plane to be processed; storing the acquired look up table in a second storage unit; and performing image data processing that performs color conversion using the look up table stored in the second storage unit.

DETAILED DESCRIPTION

Embodiments

[System Configuration of the Image Forming Apparatus 1]

Figure 1:
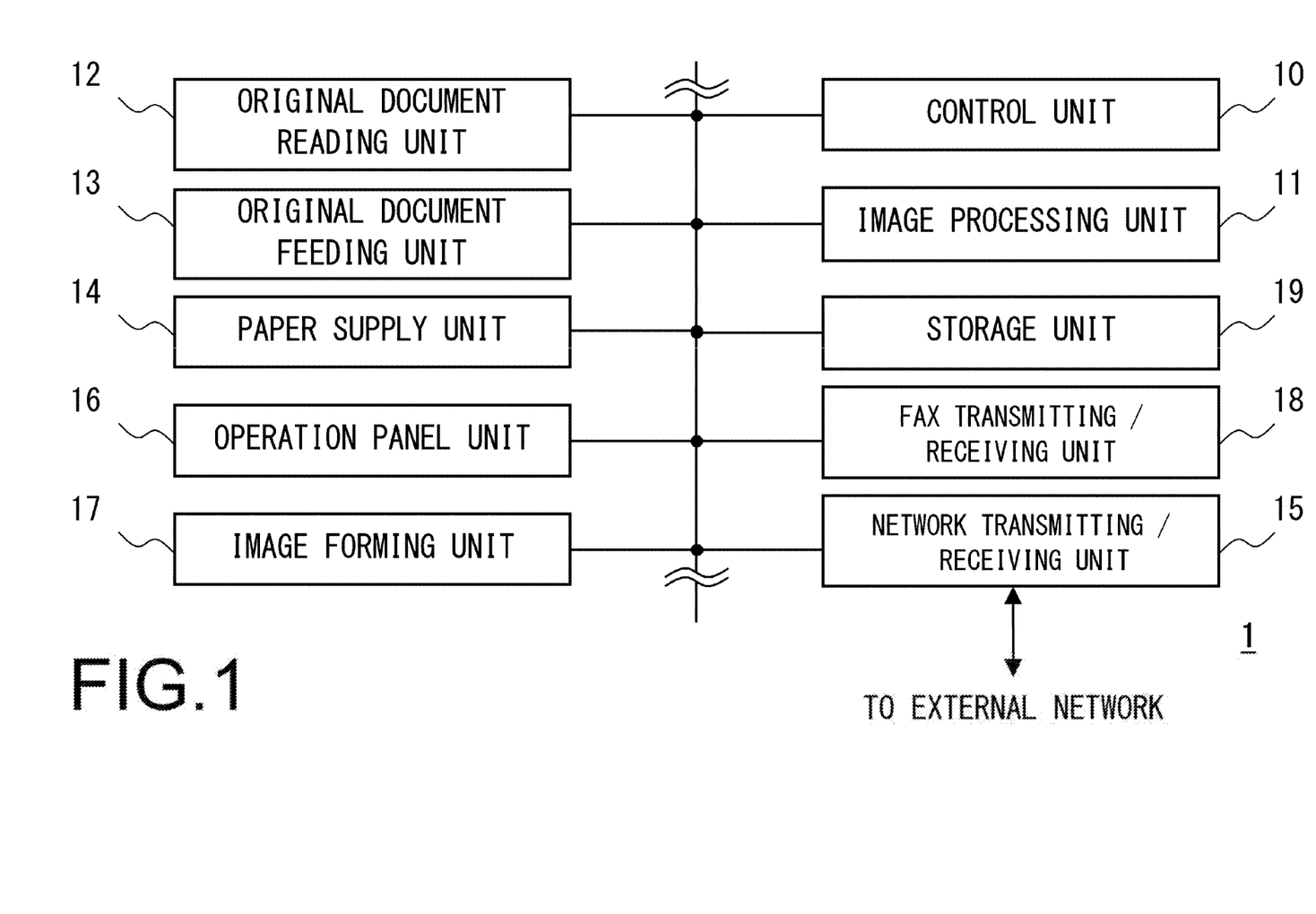
FIG. 1 is a system configuration diagram of an image forming apparatus of an embodiment according to the present disclosure.

First, the system configuration of the image forming apparatus 1 will be described with reference to FIG. 1.

The image forming apparatus 1 includes an image processing unit 11, an original document reading unit 12, an original document feeding unit 13, a paper supply unit 14, a network transmitting/receiving unit 15, an operation panel unit 16, an image forming unit 17 (image forming means), a FAX transmitting/receiving unit 18, a storage unit 19 and the like. Each unit is connected to a control unit 10, and operation is controlled by the control unit 10.

The control unit 10 is an information processing unit such as a general purpose processor (GPP), a central processing unit (CPU), a micro processing unit (MPU), a digital signal processor (DSP), a graphics processing unit (GPU), or the like.

The control unit 10 reads a control program stored in the ROM or the HDD of the storage unit 19, develops the control program in the RAM, and executes the control program. In addition, the control unit 10 performs overall control of the apparatus in accordance with predetermined instruction information that is inputted from an external terminal (not illustrated) or the operation panel unit 16.

In this embodiment, the control unit 10 can execute (accelerate) the RIP at high speed by the ASIC of the image processing unit 11 described below.

The image processing unit 11 is a control arithmetic means dedicated to image processing and performs predetermined image processing on image data. The image processing unit 11 can also perform processing such as enlargement/reduction, density adjustment, gradation adjustment, image improvement and the like, for example, as predetermined image processing.

Moreover, the image processing unit 11 stores an image that is read by the original document reading unit 12 in the storage unit 19 as printing data. At this time, the image processing unit 11 can also convert the printing data into an electronic document such as PDF or the like, or an image data file such as TIFF or the like. In addition, the image processing unit 11 may also be able to execute at least a part of the processing of an optical character recognition (OCR).

In this embodiment, the image processing unit 11 includes an ASIC or the like of an RIP accelerator.

In the RIP of this embodiment, the image processing unit 11 can convert index colors into pixel values for each plane, and perform image processing (hereinafter referred to as "pixel processing") for each pixel.

The original document reading unit 12 reads a set original document. In addition, the original document reading unit 12 is arranged on the upper portion of the main unit of the image forming apparatus 1.

The original document reading unit 12 includes a scanner, a platen glass, and an original document reading slit. When reading an original document that is placed on the platen glass, the original document reading unit 12 moves the scanner to a position facing the platen glass, reads the original document that is placed on the platen glass while scanning the original document and acquires image data, and outputs the acquired image data to the control unit 10.

Moreover, when reading an original document that is fed from the original document feeding unit 13, the original document reading unit 12 moves the scanner to a position facing the original document reading slit. Then, the original document reading unit 12, via the original document reading slit, reads the original document in synchronization with the original document feeding operation by the original document feeding unit 13, and acquires image data. The original document reading unit 12 outputs the acquired image data to the control unit 10.

The original document feeding unit 13 conveys an original document that is read by the original document reading unit 12. The original document feeding unit 13 is arranged in the upper portion of the original document reading unit 12.

The original document feeding unit 13 includes an original document placement unit and an original document conveying mechanism. The original document feeding unit 13 feeds original documents placed on the original document placement unit in order one by one by the original document conveying mechanism, and supplies the original documents to the original document reading unit 12.

The paper supply unit 14 feeds recording paper one sheet at a time to the image forming unit 17. The paper supply unit 14 is provided in the main unit.

The network transmitting/receiving unit 15 is a network connecting unit that includes a LAN board, a wireless transceiver, and the like for connecting to an external network such as a LAN, a wireless LAN, a WAN, a mobile phone network, and the like.

The network transmitting/receiving unit 15 transmits and receives data over a line for data communication, and transmits and receives audio signals over a voice telephone line.

The operation panel unit 16 includes an input unit such as buttons, a touch panel and the like, and a display unit such as a liquid crystal display (LCD), an organic EL display or the like. In addition, the operation panel unit 16 is arranged on the front side of the image forming apparatus 1.

The buttons on the input unit of the operation panel unit 16 are a numeric keypad, a start button, a cancel button, an operation mode switch, a button giving an instruction to execute a job 300 (FIG. 2), and the like. The operation mode may include mode types such as copying, FAX transmission, scanner, network scanner, and the like. In addition, the job 300 also includes printing, transmission, saving, recording, and the like of a selected document. The input unit of the operation panel unit 16 acquires instructions of various jobs 300 of the image forming apparatus 1 from the user. Moreover, it is also possible to input and change the information of each user according to user instructions acquired from the operation panel unit 16.

The image forming unit 17 forms an image on a recording sheet from data stored in the storage unit 19, read by the original document reading unit 12, or acquired from an external terminal according to an output instruction from a user.

The image forming unit 17 includes a photosensitive drum, an exposing unit, a developing unit, a transfer unit, a fixing unit, and the like. The image forming unit 17 records a toner image on a recording sheet by executing an image forming process including charging, exposure, development, transfer, and fixing.

The FAX transmitting/receiving unit 18 transmits and receives facsimiles. The FAX transmitting/receiving unit 18 can receive a facsimile from another FAX machine (not illustrated) via an audio line, store the facsimile in the storage unit 19 and cause the image forming unit 17 to form an image. In addition, the FAX transmitting/receiving unit 18 may convert an original document that is read by the original document reading unit 12 or the data of a network FAX that is transmitted from an external terminal into image data and transmit a facsimile to another FAX machine via an audio line.

The storage unit 19 is a non-transitory recording medium such as a semiconductor memory such as a read only memory (ROM), a random access memory (RAM) or the like, or a hard disk drive (HDD) or the like.

Even in a power saving state, the RAM of the storage unit 19 may hold the stored contents by a function such as self refresh or the like.

Control programs and data for performing operation control of the image forming apparatus 1 and data and the like used by the image processing unit 11 are stored in the ROM and the HDD of the storage unit 19. In addition, the storage unit 19 also stores other data such as user account settings and the like. Moreover, the storage unit 19 may include an area for storage folders for each user.

Details of data stored in the storage unit in this embodiment will be described later.

In addition, in this embodiment, an example will be described in which the RAM of the storage unit 19 and the control unit 10 are connected by a dedicated bus having a data bus width of 128 bits.

Incidentally, in the image forming apparatus 1, the control unit 10 and the image processing unit 11 may be integrally formed, such as a CPU with a built-in GPU, a chip-on-module package, an SOC (System on a Chip), and the like.

Moreover, the control unit 10 and the image processing unit 11 may include a built-in RAM, ROM, flash memory, and the like.

[Detailed Description of Index Colors]

Figure 2:
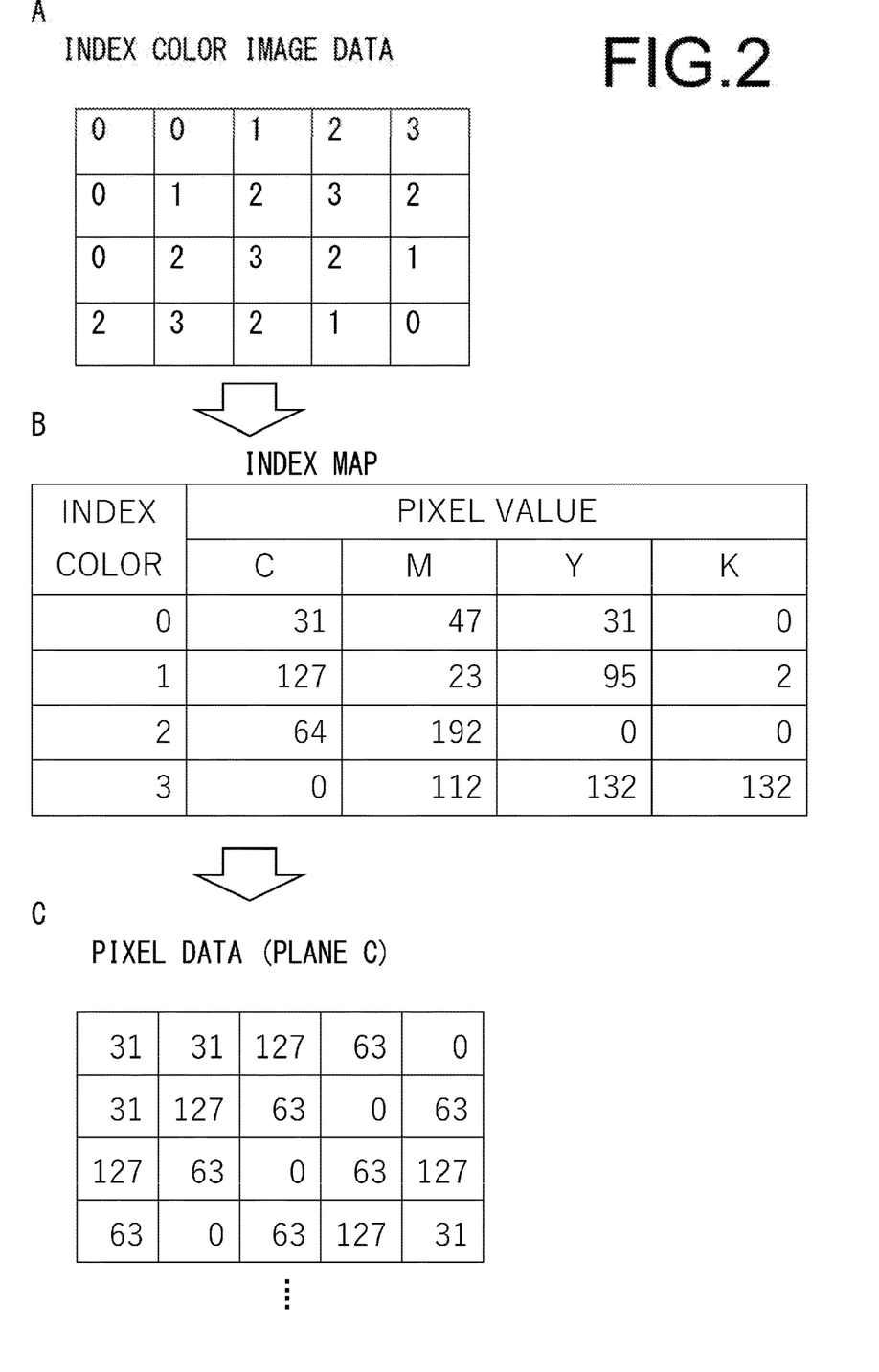
FIG. 2 is a conceptual view of index colors of an embodiment according to the present disclosure.

Here, an outline of color conversion of index colors processed by the image processing unit 11 according to this embodiment will be described with reference to FIG. 2.

A file included in page data 301 of a printing job 300 (FIG. 3) includes an designation for output in various color modes, one of which is the index color mode. For example, page data 301 in this embodiment includes image data, the output of which is designated for an index color mode of each format such as Photoshop (registered trademark), BMP, DICOM (Digital Imaging and Communications in Medicine), GIF, Photoshop EPS, Big Document Format (PSB), PCX, Photoshop PDF, Photoshop General Purpose, Photoshop 2.0, PICT, PNG, Targa (registered trademark), TIFF, and the like.

FIG. 2A illustrates an example of index color image data. For example, in a case of 8-bit index colors, an image is formed using up to $2^8=256$ index colors.

This index color image data can be created, for example, by a PC or the like, or can be created by converting from an original image that uses RGB full color or the like. At this time, in a case where the color of the original image is not included in the index map, it is possible to express the color by using the index color of the closest color or by dithering using an available index color.

As described above, in the index color mode, all colors are represented by a small number of bits, so it is possible to reduce the file size while maintaining visible image quality.

For this reason, the index color mode is suitable for multimedia presentations, web pages, and the like.

FIG. 2B illustrates an example of an index map in which a plurality of look-up tables (hereinafter, abbreviated as "LUT") are put together. In this index map, pixel values with 8-bit (0 to 255) shading (scale) are set for each index color in each plane of CMYK colors that are, for example, cyan (C), magenta (M), yellow (Y), black (K). This table of pixel values of each color is the LUT of this embodiment. In other words, the LUT of this embodiment is a table in which color palettes for converting each index color for each plane of CMYK colors are collected.

FIG. 2C illustrates an example of a LUT corresponding to a plane of color C in which each index color is changed to a pixel value of color C to create pixel data 320.

Note that the LUT of this embodiment includes LUTs for filters, functions and the like in addition to colors. The detailed configuration of these will be described later.

[Details of Data Stored in the Storage Unit 19]

Figure 3:
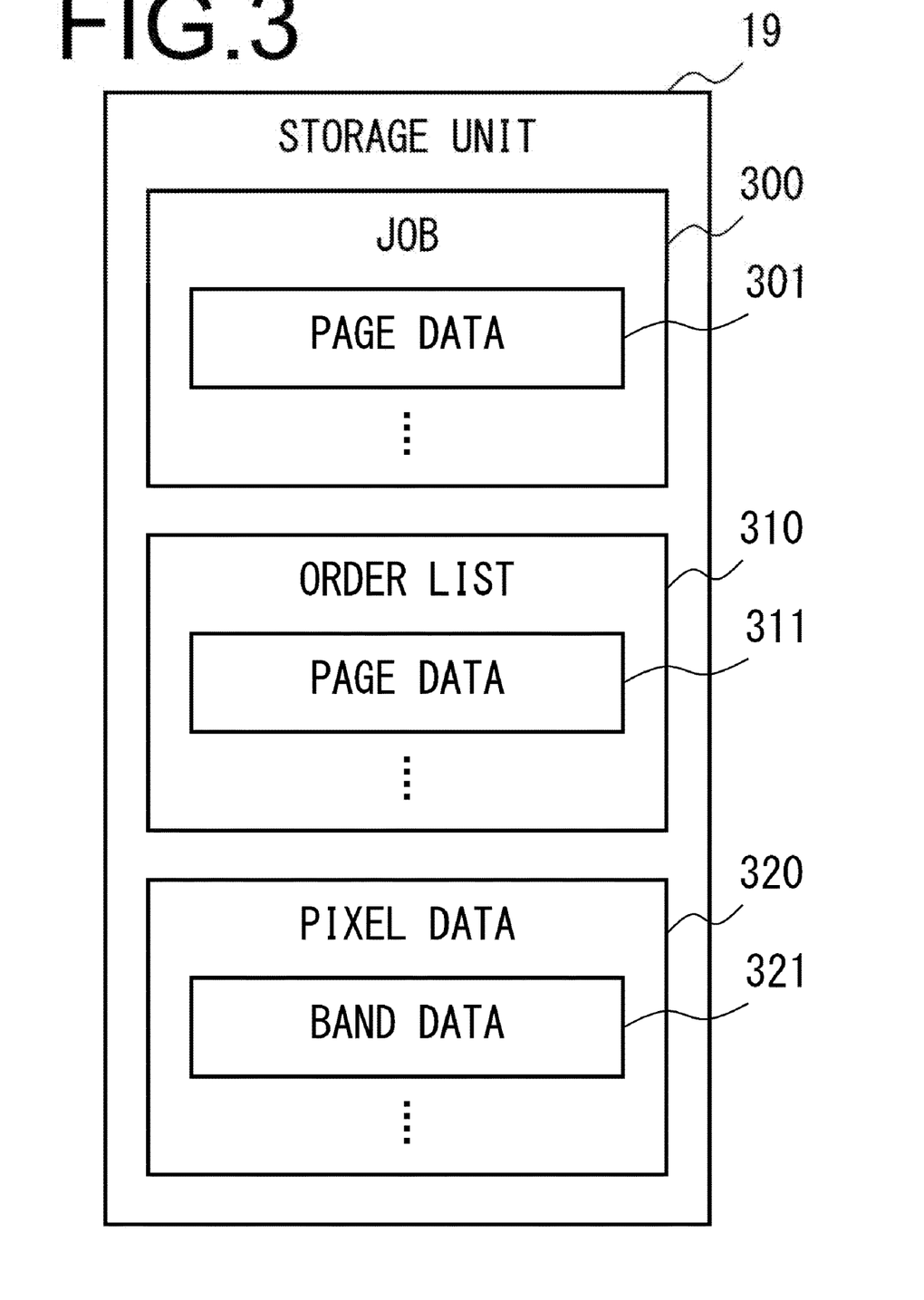
FIG. 3 is a block diagram illustrating a part of data stored in a storage unit illustrated in FIG. 1.

Here, data stored in the storage unit 19 will be described in detail with reference to FIG. 3.

In this embodiment, the storage unit 19 includes a job 300, an order list 310, and pixel data 320 as data related to color conversion of index colors.

The job 300 is printing data that includes page data 301 described in a page description language.

The order list 310 is data of collected orders 311 in which the page data 301 in the job 300 is interpreted by the control unit 10. The order 311 includes image processing instructions and data for the image processing unit 11.

More specifically, the order list 310 of the present embodiment includes an order 311 for the LUT. For example, the order list 310 of this embodiment includes an index map in which LUTs used at the time of conversion to index colors are collected and orders 311 (SOT_TRS, SOT_TRH) for specifying where each LUT is in the storage unit 19.

Furthermore, the order list 310 includes an order 311 (BLT_SHD) for actually performing drawing. This BLT_SHD is an instruction for reading an "index map" in which a plurality of LUTs are collected (FIG. 3) from the storage unit 19, using the LUTs to convert the index map to pixel values for each color of the CMYK colors, and performing processing up to writing the data of processed pixels to the storage unit 19 as pixel data 320.

Here, the orders 311 of this embodiment perform three types of specifications, Destination, Source, and Halftone at the time of drawing for a plane of each color of the CMYK colors, and perform pixel processing. Among these, the destination is a specification of an output destination of the pixel data 320, and further becomes an input source of the pixel data 320. In the RIP processing of this embodiment, the depiction according to the order list 310 is overwritten in the same area. At that time, the data before overwriting (destination) is required. In this embodiment, the position or the like in band data 321 corresponding to each plane is specified. Source is a specification of an object, image data or the like for which drawing is to be performed. Halftone is a specification for performing halftone processing.

More specifically, in this embodiment, index color conversion is mainly performed for source and halftone data. The index map of this embodiment, for the source, includes a LUT in which pixel values are collected for each of the CMYK colors, respectively. These LUTs are denoted as $LUT_{sc}$, $LUT_{sm}$, $LUT_{sy}$, and $LUT_{sk}$, respectively. The same is true for halftones, and the index map includes LUTs for each color of the CMYK colors. These LUTs are denoted as $LUT_{hc}$, $LUT_{hm}$, $LUT_{hy}$, and $LUT_{hk}$, respectively.

In addition to this, in source and halftone data filter planes are used in the same way as colors. Depending on the value set in a filter plane, it is possible to determine whether to write a binary operation result in the storage unit 19 or mask out and leave the original value as is without writing the processing result in the storage unit 19. The LUT for this filter plane is denoted as $LUT_{sf}$ for the source and $LUT_{hf}$ for the halftone.

Incidentally, in addition to the destination, the source, and the halftone, it is also possible to set a LUT and perform pixel processing for Func data that performs clipping and the like.

The pixel data 320 is image data in which the order 311 is drawn by the control unit 10 and the image processing unit 11.

The pixel data 320 of this embodiment includes band data 321 in plane units for each color of the CMYK colors, and is for an image that is formed by the image forming unit 17. Furthermore, this planes also includes special planes such as halftones, filters, and functions for performing image processing for each color.

[Configuration of the Image Processing Unit 11

Figure 4:
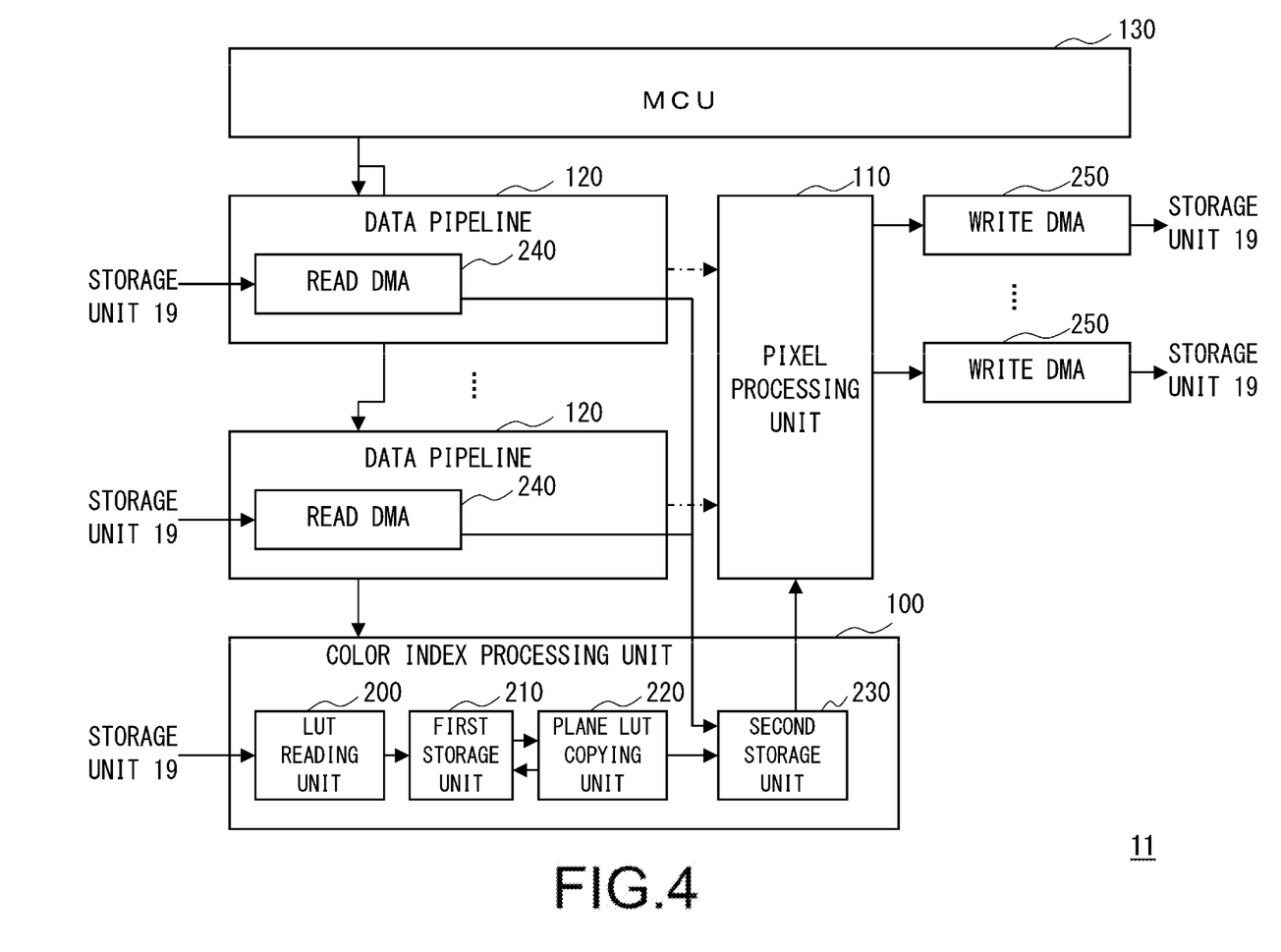
FIG. 4 is a block diagram illustrating a control configuration of the image processing unit illustrated in FIG. 1.

Next, the control configuration of the image processing unit 11 will be described with reference to FIG. 4.

In the present embodiment, the image processing unit 11 can convert index colors into pixel values for each plane and perform pixel processing.

The image processing unit 11, reads the order list 310 generated by interpreting the page file by the control unit 10, and performs image processing according to the instruction of the orders 311 included in the order list 310.

The image processing unit 11 includes a color index processing unit 100, a pixel processing unit 110, a data pipeline 120, an MCU 130, and write DMA 250.

The color index processing unit 100 is a circuit for processing index colors.

The detailed configuration of the color index processing unit 100 will be described later.

The pixel processing unit 110 is a circuit that performs pixel processing. As this pixel processing, the pixel processing unit 110 can perform a filtering process such as a binarization process (Boolean process), blending, and the like, by collecting a plurality of pixels.

The pixel data processed by the pixel processing unit 110 is stored in the storage unit 19 as band data 321 of the pixel data 320 via the write DMA 250 that writes the data to the storage unit 19.

The data pipeline 120 is a circuit that reads data from the storage unit 19 and processes the data.

The data pipeline 120 includes a read DMA 240 that reads various data from the storage unit 19.

In this embodiment, an example will be described in which the data width of the data pipeline 120 is 64 bits (dword) or 128 bits (qword).

In addition, in this embodiment, the read DMA 240 and the write DMA 250 read data from or write data to the RAM of the storage unit 19 at high speed with a data bus width of 128 bits.

The data pipeline 120 of this embodiment reads destination, source, and halftone data via the read DMA 240, performs various processes, and then writes data to the storage unit 19 via the write DMA 250. The various processes are processes such as forming an image so as to tile repetitive patterns of a specific shape, processing of source and destination data and images, and generating pixel data to be outputted. At this time, the original destination data and the destination data to be outputted have the same color depth (bpp).

To describe this using a specific example, the data pipeline 120 of this embodiment performs pixel processing by specifying a destination, a source, and a halftone for each plane corresponding to each CMYK color. For example, the data pipeline 120, for an area that is 10 pixels high and 100 pixels wide, performs processing in the order 1000 pixels of the C color plane, 1000 pixels of the M color plane, 1000 pixels of the Y color plane, and 1000 pixels of the K color plane.

The MCU 130 is an MCU (Micro Controller Unit) that controls each circuit of the image processing unit 11.

The MCU 130 reads an order list 310 from the storage unit 19 using the read DMA 240 dedicated to transferring data to the MCU 130. Then, the MCU 130 analyzes and executes the orders 311 included in the order list 310, and causes the other circuits to perform each process corresponding to the orders 311.

Next, the color index processing unit 100 will be described in detail.

The color index processing unit 100 includes a LUT reading unit 200, a first storage unit 210, a plane LUT copying unit 220, and a second storage unit 230.

The LUT reading unit 200 reads an index map, which is a plurality of LUTs for converting index colors into pixel values for each plane, from the storage unit 19, and stores the index map in the first storage unit 210.

The first storage unit 210 stores the index map that is read by the LUT reading unit 200.

In this embodiment, the first storage unit 210 is a SRAM that is included in ASIC general-purpose circuit configuration. In this SRAM, the number of read ports may be, for example, two ports.

The plane LUT copying unit 220 acquires a corresponding pixel value for each plane to be processed from the index map stored in the first storage unit 210. The plane LUT copying unit 220 acquires a LUT in which pixel values for the planes to be processed are collected from a plurality of LUTs included in the index map, and stores the LUT in the second storage unit 230.

The second storage unit 230 stores the pixel values acquired by the plane LUT copying unit 220. More specifically, the second storage unit 230 stores a LUT for the planes to be processed.

The detailed configuration of the second storage unit 230 will also be described later.

In this embodiment, the pixel processing unit 110 performs pixel processing based on the index colors that are set by the color index processing unit 100.

More specifically, the pixel processing unit 110 performs pixel processing according to the pixel values of the LUT stored in the second storage unit 230.

Figure 5:
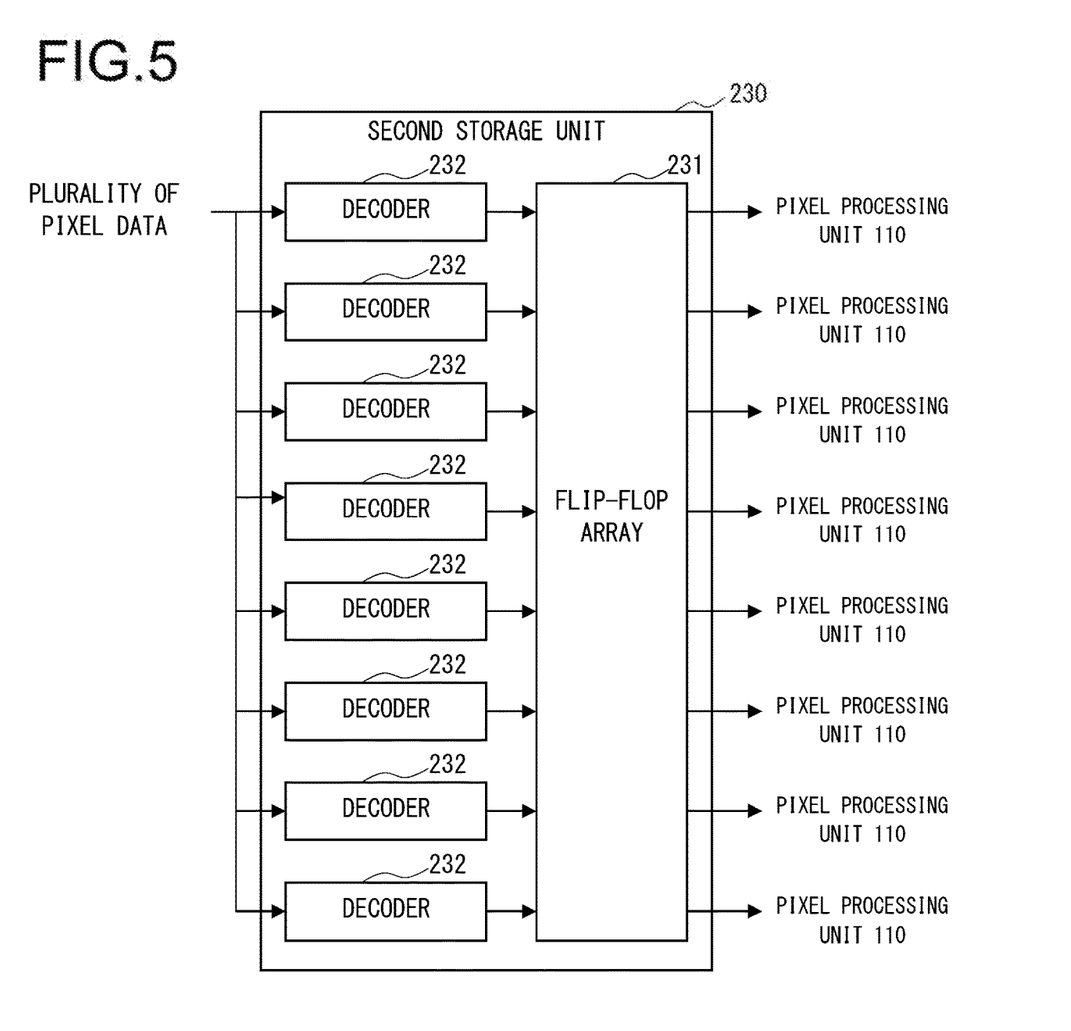
FIG. 5 is a block diagram illustrating a detailed configuration of the color index processing unit illustrated in FIG. 2.

Next, the second storage unit 230 of this embodiment will be described in detail using FIG. 5.

In this embodiment, the second storage unit 230 includes a flip-flop array 231 and a decoder 232.

The flip-flop array 231 is a circuit in which a plurality of flip flops are collected. The flip-flop array 231 includes, for example, flip flops of 256 entries.

Furthermore, the flip-flop array 231 of this embodiment is configured so that the number of read ports is greater than the number of read ports of the SRAM of the first storage unit 210. The flip-flop array 231 includes, for example, eight read ports. Therefore, each read port of the flip-flop array 231 can output eight pixel values specified by the decoder 232 at one time.

The decoder 232 is a circuit for specifying each of the pixel values of the LUT for a plurality of pixels of image data. In other words, the decoder 232, with a pointer or the like, is able to select which entry of the flip flop should be accessed.

In this embodiment, an example will be described in which eight decoders 232 are provided so that processing eight pixels can be performed at one time.

[Index Color Pixel Processing by the Image Forming Apparatus 1]

Figure 6:
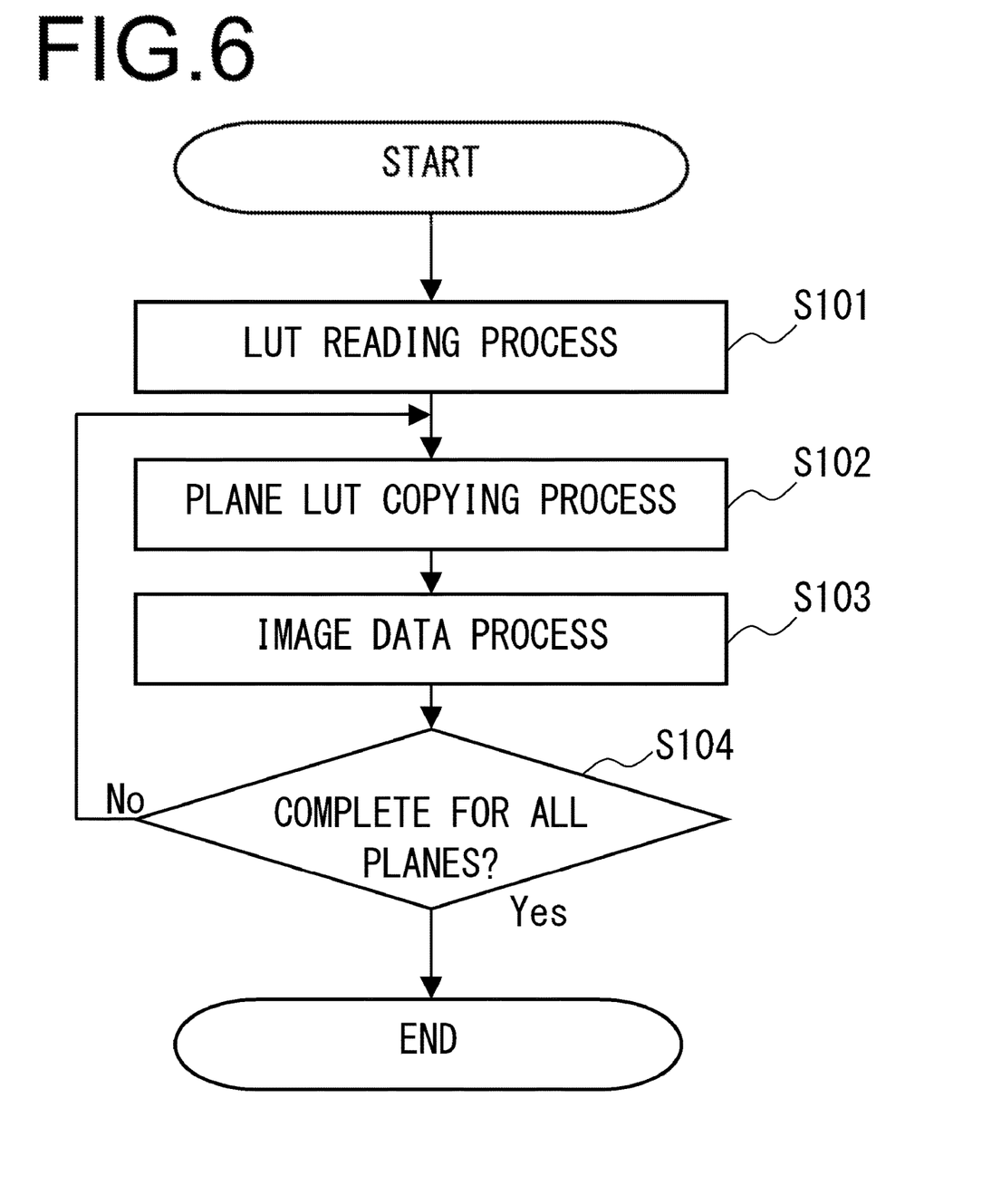
FIG. 6 is a flowchart of index color processing according of an embodiment according to the present disclosure.

Next, details of index color pixel processing by the image processing unit 11 of the image forming apparatus 1 of an embodiment according to the present disclosure will be described with reference to FIG. 6.

At the time of execution of the RIP processing of this embodiment, the control unit 10 interprets the page data 301 or the like of a job 300 stored in the storage unit 19, generates an order list 310, and arranges the order list 310 in the storage unit 19. At this time, the control unit 10 can create the order list 310 that includes the orders 311 of the LUT for converting the index colors into the pixel values for each plane, and can store the order list 310 in the storage unit 19. Then, by the control unit 10 instructing the image processing unit 11 to perform drawing, the index color pixel processing of this embodiment is executed.

In the RIP processing of this embodiment, when the address of the memory space where the order list 310 stored in the storage unit 19 is arranged is presented to the control unit 10, the image processing unit 11 reads the order list 310 from the storage unit 19 and performs image processing corresponding to that order list 310. The order list 310 includes a plurality of orders 311 as described above, and these orders 311 are sequentially processed by the image processing unit 11.

In the index color pixel processing of this embodiment, the each circuit of the image processing unit 11 mainly executes programs stored in the built-in storage unit in cooperation with each unit and using hardware resources.

The index color pixel processing will be described in detail step by step below with reference to the flowchart in FIG. 6.

(Step S101)

First, the LUT reading unit 200 performs a LUT reading process.

The LUT reading unit 200 reads the index map from the storage unit 19 and stores the index map in the SRAM of the first storage unit 210. As described above, the index map of this embodiment is data in which a plurality of LUTs for converting index colors into pixel values for each plane are collected.

(Step S102)

Next, the plane LUT copying unit 220 performs a plane LUT copying process.

In this embodiment, in accordance with the planes of each of the CMYK colors to be processed, the plane LUT copying unit 220 copies and stores the source and the halftone LUTs stored in the SRAM of the first storage unit 210 in the second storage unit 230, respectively.

More specifically, in the present embodiment, as described above, pixel processing is performed in the order of the C color plane, the M color plane, the Y color plane, and the K color plane. Therefore, the plane LUT copying unit 220 copies the LUTs corresponding to the planes from the SRAM of the first storage unit 210 to the flip-flop array 231 of the second storage unit 230 every time the plane for which processing is to be performed is changed.

Note that writing back from the flip-flop array 231 to the SRAM does not need to be performed.
(Step S103)

Next, the MCU 130, the data pipeline 120, and the pixel processing unit 110 perform image data processing.

In a case where there is a source and halftone order 311 during pixel processing, each unit performs pixel processing by performing color conversion using a LUT corresponding to the plane being processed.

In the example of this embodiment, an 8-bit index color is converted (color converted) into pixel value data of the plane.

In the 64-bit data pipeline 120 of this embodiment, it is possible to process data for eight pixels simultaneously. This is because, as described above, when the data bus width is 128 bits, it is possible to improve the performance when data that can be read from the storage unit 19 at one time is processed without being disassembled as much as possible. In this embodiment, 128-bit data is divided into two and handled as 64-bit data.

More specifically, an example will be described in which the data pipeline 120 performs pixel processing for drawing in a state where color conversion is performed on the C color plane using the source and halftone LUTs.

In this case, in the order 311 that is inputted, the C color is specified as the destination. Then, index colors are specified for the source, and index colors are specified for the halftone.

These index colors are color converted by the $LUT_{sc}$ and $LUT_{sf}$ that are read from the flip-flop array 231 for the source, then color converted to 8-bit scale color of the C color, and 8-bit scale color of the filter, and then after that pixel processing is performed. Similarly, for the halftone as well, the index color are converted into an 8-bit scale color of color C and an 8-bit scale color of the filter by the $LUT_{hc}$ and the $LUT_{hf}$ read from the flip-flop array 231.

At this time, in the data pipeline 120 of this embodiment, the flip-flop array 231 provided with eight decoders 232 simultaneously performs color conversion for a maximum of four using the LUTs. As a result, data corresponding to the plane of the C color is created, and is written to the band data 321 of the C color of the pixel data 320 of the storage unit 19 via the write DMA 250.

Incidentally, the same processing is also performed for the M color, the Y color and the K color planes.
(Step S104)

Next, the MCU 130 determines whether or not processing is complete for all of the planes. When processing is complete for all of the planes in the order list 310, the MCU 130 determines YES. Otherwise, the MCU 130 determines NO.

In the case of YES, processing returns to step S102 and the MCU 130 continues processing for the other planes.

In the case of NO, the MCU 130 ends processing for the order list 310.

From the above, index color pixel processing of an embodiment according to the present disclosure is completed.

By using a configuration such as described above, the following effects can be obtained.

In a typical technique, the LUT values are saved in an internal SRAM in order to be able to access the LUT frequently. This is because the same LUT may be used in a range from 1 dword (32 bits) to hundreds of dwords, thousands of dwords, or tens of thousands of dwords, so in a case where the data of LUT is read from memory each time, processing becomes slow.

As described above, the SRAM included in the general-purpose circuit configuration of the ASIC generally has a maximum of two read ports. Therefore, by using a two-port SRAM in this pipeline for processing eight pixels (1 dword) at a time, it is necessary to access the SRAM four times to process eight pixels. When a SRAM having one port is used, the SRAM must be accessed eight times. Therefore, there is a drop in performance.

On the other hand, the image processing unit 11 of an embodiment according to the present disclosure is characterized by including: a LUT reading unit 200 that reads a plurality of LUTs for color converting index colors into pixel values for each plane; a first storage unit 210 for storing a plurality of LUTs read by the LUT reading unit 200; a plane LUT copying unit 220 that for each plane to be processed, acquires a LUT corresponding to a plane to be processed from the plurality of LUTs stored in the first storage unit 210; a second storage unit 230 for storing the LUTs acquired by the plane LUT copying unit 220; and a pixel processing unit 110 for performing image data processing according to the LUTs stored in the second storage unit 230.

With this kind of configuration, it is possible to perform color conversion with pixel values for each plane, and to provide an image processing unit 11 capable of improving performance and increasing the speed of printing of index colors in plane units.

The image processing unit 11 of an embodiment according to the present disclosure is characterized in that the first storage unit 210 is a SRAM, and the second storage unit 230 is a flip-flop array 231 having a larger number of read ports than the first storage unit 210.

With this kind of configuration, by using the flip-flop array 231 having many read ports, it is possible to suppress a decrease in performance due to accessing the SRAM having a small number of ports each time the pixel value is changed.

The image processing unit 11 of an embodiment according to the present disclosure is characterized in that the second storage unit 230 further includes decoders 232 that simultaneously specify each pixel values for a plurality of pixels of the image data, and the read ports output the pixel values specified by the decoders 232.

With this kind of configuration, color conversion of index colors can be performed simultaneously for a plurality of pixels.

The image forming apparatus 1 of an embodiment according to the present disclosure is characterized by including an image processing unit 11.

With this kind of configuration, it is possible to increase the speed of pixel processing included in a page printer that performs image formation in plane units, and to improve printing performance.

Incidentally, in the embodiment described above, an example is described in which the storage unit 19 and the image processing unit 11 are connected with a data width of 128 bits. However, the data width may be 256 bits, 384 bits, 512 bits, and the like.

Furthermore, even though the data width of the above-mentioned data pipeline 120 is described as being 64 bits or 128 bits, the data width may also have other numbers of bits.

In addition, in the above-mentioned second storage unit 230, even though an example in which eight decoders 232 are provided has been described, the number may be smaller or larger.

With this kind of configuration, it is possible to perform color conversion of the optimal index colors that match each configuration. In each of these cases, it is preferable to suppress an increase in circuit size and to optimize the balance between performance and circuit size.

In the embodiment described above, even though an example in which 8-bit index colors are color converted to CMYK colors has been described, the present disclosure is also applicable to color conversion of other index colors.

For example, the embodiment described above can also be used for conversion or the like to 4-bit to 16-bit index colors, R (Red), G (Green), B (Blue), W (White) from index colors, and other complimentary colors.

Note that in the embodiment described above, the destination is described as not using a LUT.

However, a LUT may also be used for the destination. In this case, in step S102 described above, a LUT may be copied to the flip-flop array 231 for a destination as well.

Part or any combination of the functional configurations described above may be configured by a programmable logic other than ASIC, a field-programmable gate array (FPGA), or the like.

In addition, the technique according to the present disclosure can also be applied to an information processing apparatus other than an image forming apparatus. For example, the technique may also be used for a network scanner, a server to which a scanner is separately connected by USB or the like, a PC (Personal Computer), a portable terminal, or the like that requires conversion of index colors. Furthermore, the technique may also be used in ASICs such as a projector that includes color electronic paper, and a color wheel, and the like Moreover, it goes without saying that the configuration and operation of the above-described embodiment are examples and can be appropriately changed and executed within a range that does not departing from the scope of the present disclosure.

What is claimed is:

1. An image processing apparatus, comprising
a control unit configured to obtain image data in which colors of an image are represented by values ('index colors'); and
a look up table reading unit configured to read a collection ('index map') of a plurality of look up tables, wherein each of the plurality of look up tables corresponds to a respective plane of a plurality of planes, and each of the plurality of look up tables contains data for color converting the index colors into respective pixel values for the specified plane;
wherein
the control unit is configured to generate an order list from the image data, wherein the order list comprises a first order and a second order, wherein each of the first order and the second order is an order to use a specified look up table of the index map to convert the index colors represented in the image data to respective pixel values, wherein the first order and the second order correspond to different planes of the plurality of planes;
the image processing apparatus comprises a first storage unit, a second storage unit, a plane LUT copying unit, and a pixel processing unit;
the control unit is configured to read the order list and execute the order list in accordance with the orders by causing:
the look up table reading unit to perform said read of the index map;
the first storage unit to store the index map read by the look up table reading unit;
the plane LUT copying unit to acquire the look up table identified by the first order and corresponding to a respective plane from the index map stored in the first storage unit;
the second storage unit to store the look up table identified by the first order and acquired by the plane LUT copying unit;
the pixel processing unit to perform image data processing that by performing color conversion on pixels of the image data according to the look up table identified by the first order and stored in the second storage unit;
the plane LUT copying unit to acquire the look up table identified by the second order and corresponding to a respective plane from the index map stored in the first storage unit;
the second storage unit to store the look up table identified by the second order and acquired by the plane LUT copying unit; and
the pixel processing unit to perform image data processing by performing color conversion on pixels of the image data according to the look up table identified by the second order and stored in the second storage unit.

2. The image processing apparatus according to claim 1, wherein
the first storage unit is a SRAM, and
the second storage unit is a flip-flop array having a larger number of read ports than the first storage unit.

3. The image processing apparatus according to claim 2, wherein the second storage unit further comprises
decoders configured to simultaneously specify the pixel values for each of a plurality of pixels of the image data, and wherein
the read ports output the pixel value specified by the decoders.

4. An image forming apparatus comprising the image processing apparatus according to claim 1.

5. The image processing apparatus according to claim 1, wherein
the plurality of planes comprises a cyan plane, a magenta plane, a yellow plane, and a black plane; and
the order list comprises four orders corresponding to the cyan plane, the magenta plane, the yellow plane, and the black plane, respectively.

6. The image processing apparatus according to claim 1, wherein the pixel processing unit performs said color conversion on pixels of the image data according to the look up table identified by the first order prior to the plane LUT copying unit performing said acquisition of the look up table identified by the second order.

7. An image processing method executed by an image processing apparatus, whereby the image processing apparatus performs the steps of:
obtaining image data in which colors of an image are represented by values ('index colors');
generating an order list from the image data, wherein the order list comprises orders to interpret the image data, each of the orders being an order to use a specified look up table to convert the index colors represented in the image data to respective pixel values, wherein the specified look up table is part of a collection ('index map') of a plurality of look up tables corresponding to respective planes and containing data for color converting the index colors into respective pixel values for the respective plane, and wherein the orders comprise at least a first order and a second order corresponding to respective planes;
reading the order list; and
executing the order list in accordance with the orders by:
reading the index map;
storing the read index map in a first storage unit;
acquiring the look up table identified by the first order and corresponding to a respective plane from the index map stored in the first storage unit;
storing the acquired look up table identified by the first order in a second storage unit;
performing image data processing by performing color conversion on pixels of the image data using the look up table identified by the first order and stored in the second storage unit;
acquiring the look up table identified by the second order and corresponding to a respective plane from the index map stored in the first storage unit;
storing the acquired look up table identified by the second order in a second storage unit; and
performing image data processing by performing color conversion on pixels of the image data using the look up table identified by the second order and stored in the second storage unit.

8. The image processing method according to claim 7, wherein
the first storage unit is a SRAM, and
the second storage unit is a flip-flop array having a larger number of read ports than the first storage unit.

9. The image processing apparatus according to claim 8, further comprising the steps of:
simultaneously specifying the pixel values for each of a plurality of pixels of the image data; and
outputting the specified pixel value.

10. The image processing method according to claim 7, wherein
the respective planes of the plurality of look up tables comprise a cyan plane, a magenta plane, a yellow plane, and a black plane; and
the order list comprises four orders corresponding to the cyan plane, the magenta plane, the yellow plane, and the black plane, respectively.

11. The image processing method according to claim 7, wherein the step of performing said color conversion on pixels of the image data according to the look up table identified by the first order is performed prior to the step of performing said acquisition of the look up table identified by the second order.

* * * * *